(12) United States Patent
Mignon (10) Patent No.: US 8,557,087 B2
(45) Date of Patent: Oct. 15, 2013

(54) PROCESS FOR THE SEPARATION OF A HYDROCARBON-CONTAINING FEED STREAM

(75) Inventor: Denis Mignon, Braine-l'Alleud (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 645 days.

(21) Appl. No.: 12/669,132

(22) PCT Filed: Jul. 15, 2008

(86) PCT No.: PCT/EP2008/059247
§ 371 (c)(1),
(2), (4) Date: Jun. 21, 2010

(87) PCT Pub. No.: WO2009/010513
PCT Pub. Date: Jan. 22, 2009

(65) Prior Publication Data
US 2010/0264014 A1 Oct. 21, 2010

(30) Foreign Application Priority Data
Jul. 16, 2007 (EP) ..................................... 07112521

(51) Int. Cl.
*B01D 3/42* (2006.01)
*C07C 7/04* (2006.01)
*G05D 7/00* (2006.01)
*G05D 9/00* (2006.01)

(52) U.S. Cl.
USPC ..... 203/1; 203/22; 203/98; 203/99; 203/DIG. 18; 203/DIG. 19; 203/DIG. 25; 202/161; 202/196; 585/810; 585/837; 700/270; 700/273; 700/281; 700/282

(58) Field of Classification Search
USPC ............... 203/1, 22, 98, 99, DIG. 8, DIG. 18, 203/DIG. 19, DIG. 25; 202/161, 196; 585/810, 837; 700/270, 273, 281, 282
See application file for complete search history.

(56) References Cited

U.S. PATENT DOCUMENTS

| | | | |
|---|---|---|---|
| 3,150,064 A | 9/1964 | Dobson | |
| 3,294,648 A | 12/1966 | Lupfer et al. | |
| 3,411,308 A | 11/1968 | Bellinger | |
| 3,619,377 A | 11/1971 | Palmer et al. | |
| 3,905,873 A | 9/1975 | Wright et al. | |
| 4,377,444 A * | 3/1983 | Wu | 203/96 |
| 4,589,957 A * | 5/1986 | Sherk et al. | 203/75 |
| 5,336,376 A * | 8/1994 | Taurat et al. | 202/182 |
| 5,529,667 A * | 6/1996 | Coffey | 203/96 |
| 5,681,908 A | 10/1997 | Mehra et al. | |
| 6,281,300 B1 | 8/2001 | Kendrick | |
| 7,351,311 B2 * | 4/2008 | Windecker et al. | 203/75 |
| 2005/0197521 A1 | 9/2005 | Kreischer | |

FOREIGN PATENT DOCUMENTS

| | | |
|---|---|---|
| EP | 0216991 A1 | 4/1987 |
| JP | 59-164730 A | 9/1984 |
| JP | 60-181036 A | 9/1985 |

* cited by examiner

*Primary Examiner* — Virginia Manoharan (57) ABSTRACT

The present invention relates to a process for the separation by distillation of a hydrocarbon-containing feed stream containing olefin monomer, co-monomer and hydrocarbon diluent. The present invention also relates to a distillation system including a distillation column for carrying out the process according to the invention.

17 Claims, 5 Drawing Sheets

PROCESS FOR THE SEPARATION OF A HYDROCARBON-CONTAINING FEED STREAM

CROSS-REFERENCE TO RELATED APPLICATIONS

This application claims the benefit of PCT/EP2008/059247, filed Jul. 15, 2008, which claims priority from EP 07112521.5, filed Jul. 16, 2007.

FIELD OF THE INVENTION

This invention relates to process control. In a first aspect, the invention relates to a process for improving the operation of a distillation system, in particular adapted to separate a hydrocarbon-containing feed stream. In particular, the present invention relates to a process for optimizing the separation of a hydrocarbon-containing feed stream obtained from a polymerization process and for recovering hydrocarbon diluent, monomer and co-monomer, such that these can be re-used in the polymerization process. In another aspect, the invention relates to a distillation system for carrying out said process.

BACKGROUND OF THE INVENTION

In a typical polymerisation reaction, monomer, diluent, catalyst, co-catalyst and optionally co-monomer and hydrogen are fed to a reactor where the monomer is polymerised. The diluent does not react but is typically utilised to control solids concentration and also to provide a convenient mechanism for introducing the catalyst into the reactor.

Following such polymerization process, a polymerisation effluent is produced comprising slurry of polymer solids in a liquid that contains diluent, dissolved unreacted monomer, and dissolved unreacted co-monomer. Typically, this liquid also includes traces of heavier elements, e.g. oligomers, and lighter components including $H_2$, $N_2$, $O_2$, CO and/or $CO_2$. Catalyst will generally be contained in the polymer.

The polymer is separated from the liquid by techniques such as flash vaporisation. Afterwards, it is highly desirable to further treat the vapors in order to recover the unreacted monomer, unreacted co-monomer and the diluent, since there is an economic interest in re-using these separated components including the monomer, co-monomer, and the diluent, in a polymerization process.

It is well known in the art that separation of a vaporous stream comprising unreacted monomer, unreacted co-monomer and diluent issued from the effluent of a polymerization process may be treated in a distillation system for separation of its components. U.S. Pat. No. 4,589,957 for instance describes a separation process of a hydrocarbon-containing vaporous stream comprising monomer, co-monomer and diluent issued from the effluent of a homo-polymerization and/or co-polymerization process. The described process comprises subjecting the vaporous stream to two-stage distillation provided with a common accumulation zone wherein the condensate from the accumulation zone serves as the source of feed for the second distillation and reflux for the first distillation.

In view of re-using the separated components issued from the effluent of a polymerization process in said process, it is important, that the separation process of a vaporous effluent stream is done in a manner such that high purity streams of monomer, co-monomer and diluent are separately recovered. It is also highly required to substantially eliminate the lighter components, as those indicated above, from such vaporous effluent stream, since recycling of such lighter components to the polymerization process could seriously reduce polymerization efficiency and induce sub-optimal polymerization conditions.

However, a major problem encountered in many distillation systems, is that distillation columns used in such systems show stability problems. Distillation conditions in such columns may undergo important oscillations in temperature and pressure values, resulting in a fluctuation of their operation conditions. As a result thereof, separation of the different components of vaporous effluent streams is sub-optimal.

Another problem related to distillation systems is a sub-optimal separation of lighter components, including $H_2$, $N_2$, $O_2$, CO and/or $CO_2$, from diluent. As a consequence, use of diluent containing these components in a polymerization process may result in sub-optimal polymerization conditions.

Yet another problem associated with distillation systems for separating vaporous polymerization effluent streams is the high amount of energy which is required for carrying out the separation process.

In view of the above, it is clear that there remains a need in the art for providing more accurate systems for separating vaporous hydrocarbon containing effluent streams, for instance those issued from a polymerization process.

It is therefore an object of the present invention to provide a process for optimizing the separation of a hydrocarbon-containing feed stream.

It is further an object of the present invention to provide a process for improving the operation of a distillation system. More in particular, it is an aim to provide a process for improving stability of a distillation system.

It is yet another object of the present invention to provide a process for maximizing the separation of lighter components from other components comprised in a hydrocarbon feed stream.

A further object of this invention is to provide a process for reducing the energy consumption of a distillation system.

Yet another object of the present invention is to provide a process wherein more olefin-free hydrocarbon diluent is recycled than the amount that can be re-used in a polymerization reaction.

SUMMARY

The present invention relates to a process for the separation of a hydrocarbon-containing feed stream. More in particular, the present invention is primarily directed to a process for improving the separation of a vaporous hydrocarbon containing stream separated from the effluent from a homo-polymerization and/or co-polymerization process.

In a first aspect, the present invention relates to a process for the separation of a hydrocarbon-containing feed stream comprising olefin monomer, co-monomer and hydrocarbon diluent, comprising the steps of passing said feed stream to a distillation column, and
  subjecting said feed stream to distillation conditions whereby
    a bottom stream comprising substantially olefin-free hydrocarbon diluent is removed,
    a side stream comprising hydrocarbon diluent is removed, and
    an overhead vapor stream comprising olefin monomer, hydrocarbon diluent and
    further components such as $H_2$, $N_2$, $O_2$, CO, $CO_2$ and formaldehyde is removed, characterized in that the process further comprises the step of feeding at least a part of said bottom stream to said side stream.

It has been shown in the art that distillation conditions in distillation columns may undergo significant variation, which results in a fluctuation of their operation conditions and partial separation of effluent streams. Lighter components such as formaldehyde, $H_2$, $N_2$, $O_2$, CO, and/or $CO_2$, may therefore be insufficiently separated from hydrocarbon diluent side and bottom streams.

The present invention overcomes at least some of the problems of prior art processes by permitting to increase the flow rate of the vaporous effluent stream comprising lighter components. For that, the present method is directed to increasing the amount of bottom stream comprising substantially olefin-free hydrocarbon diluent which is removed from a distillation column.

In one embodiment, the invention provides a process, comprising the steps of:
  removing the bottom stream from the distillation column and storing said bottom stream in a bottom stream storage vessel,
  removing the side stream from the distillation column and storing said side stream in a side stream storage vessel,
  removing bottom stream from said bottom stream storage vessel and,
  feeding at least part of the bottom stream that is removed from the bottom stream storage vessel to said side stream storage vessel.

In another embodiment, the invention provides a process wherein the step of feeding at least a part of the bottom stream that is removed from the bottom stream storage vessel to said side stream storage vessel is regulated by the steps of:
  measuring the level of said bottom stream in said bottom stream storage vessel,
  comparing said measured level with a pre-determined level, and
  when said measured level exceeds said pre-determined level, feeding at least part of the bottom stream that is removed from the bottom stream storage vessel to said side stream storage vessel.

In another preferred embodiment, a process is provided wherein the feed stream is condensed prior to introduction in the distillation column, thereby obtaining a condensate, and wherein said condensate is stored in a condensate vessel. According to an embodiment, said condensate is removed from said condensate vessel and at least a portion thereof is returned to the distillation column as reflux stream.

The invention provides a process, wherein the flow rate of the bottom stream removed from the distillation column is regulated by the steps of:
  determining a ratio set point (R') which is equal to B'/F', wherein B' is the flow rate of bottom stream, and F' is the flow rate of feed stream,
  measuring the actual flow rate (F) of feed stream which is introduced in the distillation column,
  calculating a theoretical flow rate (B*) of bottom stream by multiplying the actual feed stream flow rate (F) by said ratio set point (R'),
  measuring the actual flow rate (B) of bottom stream which is removed from the distillation column, and
  regulating the flow rate of the reflux stream from said condensate vessel to said distillation column for adapting the actual bottom stream flow rate (B) to the theoretical bottom stream flow rate (B*).

In one embodiment the ratio set point (R') is a theoretical value. In another embodiment, the ratio set point is controlled in real-time so as to obtain a desired flow rate of vapor stream. Preferably, said ratio set point is lower than or equal to 1.0.

In another embodiment the process comprises the step of re-boiling a portion of the bottom stream obtained in the distillation column under controlled steam flow rate and the step of returning said re-boiled portion to the distillation column. Preferably, said steam flow rate is controlled as a function of the temperature in the distillation column, and preferably of the temperature on a tray located in the lower half of the column.

In yet another embodiment the process comprises the step of controlling the level of the distillation column sump.

In still another embodiment the process comprises the step of controlling the flow rate of the reflux stream from the condensate vessel to the distillation column.

In accordance with the present method, the step of sending or adding at least a part of said bottom stream to the side stream has various advantageous effects.

The present process and the various improvements thereof, as described herein enable the separation of a hydrocarbon-containing feed stream in different high purity streams of monomer, co-monomer and hydrocarbon diluent, which can be separately recovered and re-used in a polymerization process.

In addition, the present process ensures a very stable operation of the distillation column.

Moreover, flow rate of light components is increased and maintained in all circumstances to ensure proper removal of light components such as formaldehyde, $H_2$, $N_2$, $O_2$, CO and $CO_2$ By adapting the ratio of the bottom stream flow removed from the distillation column to the feed stream flow introduced in the distillation column, the flow rate of the bottom stream is made independent from downstream variations. Only variations in the feed stream flow rate will have an influence on the bottom stream flow rate. By choosing a suitable value of the ratio, it can also be ensured in all circumstances that enough substantially olefin-free hydrocarbon diluent is produced and that a suitable overhead stream flow rate is obtained to entrain the light components.

In a preferred embodiment, the ratio of bottom stream flow removed from the distillation column to the feed stream flow introduced in the distillation column is lower than or equal to 1.0, and is for instance comprised between 0.3 and 1.0, or between 0.4 and 0.95.

In accordance with the present process, the ratio may be adapted by introducing various technical improvements in the distillation column, as explained in further detail below.

Moreover, the present process even allows removing more bottom stream product than what is needed for re-use in a polymerization reaction. In particular, hydrocarbon diluent, separated according to the present process can be re-used in a polymerization process.

The hydrocarbon diluent issued from the side stream exiting from the distillation zone is generally used as diluent in a polymerization reactor, either homo-polymerization or co-polymerization depending upon monomers being subjected to polymerization. It is in particular very suitable for use as diluent especially in a second polymerization reactor when polymerizing under bimodal operation, or in a first as well as a second reactor, when polymerizing under monomodal operation.

The hydrocarbon diluent issued from the bottom side stream exiting from the distillation zone can be recycled to a polymerization zone, whether homo-polymerization or co-polymerization, at any place of the process where pure diluent is requested, like for catalyst dilution.

In some instances and in monomodal mode in particular, the production of olefin-free hydrocarbon diluent may be in excess of the real requirements, e.g. for use in polymerization reactions. However, in accordance with the present invention, even in cases where more olefin-free hydrocarbon diluent than needed for re-use is separated, the present process ensures the separation of excess amounts of bottom stream irrespective of the downstream need thereof, and thus assures stability of the distillation system, by feeding to the side stream an amount of bottom stream which is in excess of the amount required for recycling purposes. Having regard to the prior art in the present technical field, the present method can be considered as unconventional and unusual, especially since it is directed to the addition of a purified product, i.e. olefin-free hydrocarbon diluent, to a product of 'lower quality' and purity, i.e. to a side stream comprising hydrocarbon and residual amounts of olefin monomer.

In another embodiment, the present invention relates to a process comprising the steps of:
a) separating the feed stream prior to feeding said feed stream to a distillation column into a1) a bottom stream comprising co-monomer, and a2) an overhead stream comprising hydrocarbon diluent, olefin monomer and further components such as $H_2$, $N_2$, $O_2$, CO, $CO_2$, and formaldehyde, and
b) feeding said overhead stream to said distillation column.
Separation in step a) may be done in another distillation column. In such case, the present process involves the use of two distillation columns.

In yet another embodiment, the present invention relates to a process comprising the steps of:
a) separating the feed stream prior to feeding said feed stream to a distillation column into a1) a bottom stream comprising co-monomer and hydrocarbon diluent, and an a2) overhead stream comprising hydrocarbon diluent, olefin monomer and further components such as $H_2$, $N_2$, $O_2$, CO, $CO_2$, and formaldehyde, and
b) feeding said overhead stream to said distillation column.
The bottom stream obtained in step a) is preferably further separated into a stream comprising co-monomer and a stream comprising hydrocarbon diluent. Separation in step a) may be done in two other distillation columns, whereby one column effects separation in a bottom and overhead stream, and another column effects further separation of the said bottom stream. In such case, the present process involves the use of three distillation columns.

In another aspect, the present invention relates to a distillation system comprising a distillation column which is configured to separate a hydrocarbon-containing feed stream comprising olefin monomer, co-monomer and hydrocarbon diluent, into
a bottom stream comprising substantially olefin-free hydrocarbon diluent,
a side stream comprising hydrocarbon diluent, and
an overhead vapor stream comprising olefin monomer, diluent and further components such as $H_2$, $N_2$, $O_2$, CO, $CO_2$ and formaldehyde,
wherein said distillation system comprises
a feeding line for feeding said feed stream to said distillation column,
a removal device for removing said bottom stream from said distillation column, a bottom stream storage vessel operably connected to said removal device for storing removed bottom stream, and a removal line operably connected to said bottom stream storage vessel for removing bottom stream from said bottom stream storage vessel,
a removal device for removing said side stream from said distillation column, a side stream storage vessel operably connected to said removal device for storing removed side stream, and a removal line operably connected to said side stream storage vessel for removing side stream from said side stream storage vessel, and
a removal device for removing said overhead vapor stream from said distillation column,
The distillation system is in particular characterized in that it comprises a connecting line connecting said removal line with said side stream storage vessel. In particular, the connecting line is connected to said removal line and is connected to said side stream storage vessel, and operably connects the removal line to the side stream storage vessel.

In one embodiment the distillation system comprises a condenser for condensing said feed stream prior to introduction in the distillation column, and a condensate vessel for storing said condensed feed stream.

In another embodiment the distillation system comprises a level controller for measuring the level of bottom stream in said bottom stream storage vessel and for regulating the feeding of at least a part of said bottom stream to said side stream, and a valve which is provided on said connecting line and operably connected to said level controller.

The present invention also relates to a distillation system comprising a distillation column suitable for carrying out the process according to the invention.

Other objects, aspects, as well as the several advantages of the invention will be apparent to those skilled in the art upon further consideration of the specification, the drawings, and the appended claims.

DETAILED DESCRIPTION OF THE INVENTION

The present invention is directed to the separation process of a vaporous hydrocarbon stream. In a preferred example, such vaporous hydrocarbon stream may be issued from the effluent of a polymerization process, in particular for the polymerization of ethylene.

Suitable "ethylene polymerization" includes but is not limited to homo-polymerization of ethylene, co-polymerization of ethylene and a higher 1-olefin co-monomer such as butene, 1-pentene, 1-hexene, 1-octene or 1-decene. In a preferred embodiment, the present invention is directed to the separation process of a vaporous stream, which is issued from the effluent of an ethylene polymerization reaction wherein reactants including the monomer ethylene, isobutane as hydrocarbon diluent, a catalyst, the co-monomer 1-hexene and hydrogen are used. However, it will be appreciated that the present separation process is applicable to separate a vaporous stream, which is issued from the effluent of any other polymerization reaction involving other monomer, co-monomer and diluent systems as long as the feed vapors comprise hydrocarbons which permit separation by distillation.

More in particular, the present invention relates to a separation process of a hydrocarbon-containing feed, wherein said hydrocarbon-containing feed stream comprising olefin monomer, co-monomer and hydrocarbon diluent is an effluent stream obtained from a polymerization process for preparing polyethylene, and preferably for preparing monomodal or bimodal polyethylene. Preferably, separated monomer, hydrocarbon diluent and co-monomer are re-used in said polymerization process. "Bimodal PE" refers to PE that is manufactured using two reactors, which are connected to each other in series, the operating conditions being different in the two reactors. "Monomodal PE" is produced in a single reactor or using two reactors in series, with identical operating conditions.

As used herein, the term "polymerization slurry" or "polymer slurry" or "slurry" means substantially a two-phase composition including polymer solids and liquid. The solids include catalyst and a polymerized olefin, such as polyethylene. The liquids include an inert diluent, such as isobutane, with dissolved monomer such as ethylene, co-monomer, molecular weight control agents, such as hydrogen, antistatic agents, antifouling agents, scavengers, and other process additives.

The terms "distillation system" or "separation system", "recovery system", are used herein as synonyms and refer to systems comprising all necessary equipment adapted to separate and recover unreacted reactants form the effluent stream of a polymerization reaction. Such recovery systems generally include one or more distillation columns. The term "distillation zone" and "distillation column" may be used herein as synonyms. In a preferred embodiment, the present distillation process is carried out in a distillation system, which comprises one or more distillation zones or columns.

In a preferred embodiment, one or more of said distillation columns are tray columns. Such tray columns comprise a number of trays of various designs to hold up the liquid in order to provide better contact between vapor and liquid. Trays essentially act as a unit operation, each accomplishing a fraction of the separation between liquid and gas. It is clear that the more trays there are, the better the degree of separation, and thus the better column performance will be. However, using a large number of trays in distillation columns has important disadvantages, especially with regard to construction. The present invention therefore preferably relates to the operation of a distillation system having column(s) with a low number of trays, preferably lower than 25, even more preferred lower than 20. Nevertheless, although distillation columns with a low number of trays are applied in the present distillation process, improvements on the operation of the present distillation systems, as explained into more detail below, permit to achieve a similar degree of separation as for columns with a higher number of trays. Advantageously, application of the present distillation process includes the benefits of less energy usage and lower construction costs.

In an alternative embodiment, the present distillation process may be carried out in a divided wall distillation column or divided wall column. Such column is a distillation vessel having a vertical partition separating one side from the other for a portion or all of the height of the vessel. Although such column comprises a larger number of trays, the use of such single column may be advantageous with regard to construction costs and energetic requirements.

In another alternative embodiment, the present distillation process may be carried out in packing columns. By packing column it is meant a column packed with for example solid particles through which liquid flows and the gas rises.

Following a polymerization process, polymer effluent is generally separated from the liquid by flash vaporization. According to the invention, the hereby obtained vaporous feed stream, comprising monomer, such as ethylene, co-monomer, such as 1-hexene, and diluent, such as isobutane, is subsequently separated into individual monomer, co-monomer and diluent streams in a separation system comprising one or more distillation zones. Separate streams of monomer, co-monomer and diluent are recovered for further use, e.g. use in the polymerization reaction. The vaporous feed stream, coming from the flash tanks also comprises traces of both heavier, e.g. oligomers, and lighter components including $N_2$, $H_2$, and light poisonous components such as $O_2$, $CO$ and $CO_2$, and formaldehyde. Such components are herein also denoted as "poisonous components", because such components are detrimental for the activity of a catalyst. Re-introduction thereof into a polymerization reactor could greatly disturb catalyst activity and thus reduce polymerisation efficiency. It is therefore of the utmost importance to have a recovery system adapted to recover essentially pure streams of (co-)monomer, and diluent, without substantial residual amount of such poisonous components for re-use in a polymerisation process.

According to the present process the feed stream is introduced to a distillation column and subjected to distillation conditions adapted to remove a bottom stream comprising substantially olefin-free hydrocarbon diluent, a side stream comprising hydrocarbon diluent, and an overhead vapor stream comprising olefin monomer, diluent and further components such as $H_2$, $N_2$, $O_2$, $CO$, $CO_2$ and formaldehyde.

In this specification, whenever reference is made to one or more products in a distillated stream, reference is made to a stream which comprises more than 80%, and preferably more than 90%, and even more preferred more than 95%, and even more preferred more than 99% of the indicated product(s).

The bottom stream comprises substantially olefin-free hydrocarbon diluent. The term "substantially olefin-free hydrocarbon diluent" or "olefin-free diluent" or the like are used herein as synonyms to denote hydrocarbon diluent which contains less than 5000 ppm, and preferably less than 1000 ppm, and even more preferred less than 100 ppm of monomer and/or co-monomer. Substantially free of traces of monomer such as ethylene and/or co-monomer such as hexene, the bottom stream of olefin free hydrocarbon diluent, such as isobutane, issued from the distillation column can be sent to a storage tank and further used, e.g. for flushing conduits and circulation pumps in a polymerization reactor, or for catalyst preparation e.g. in mud pots. This olefin-free diluent can be recycled to a polymerization zone, whether homo-polymerization or co-polymerization, at any place of the process where pure diluent is requested, like the catalyst dilution.

The side stream of hydrocarbon diluent issued from the distillation column is generally sent to a storage tank and further used. Preferably, the amount of further components such as $H_2$, $N_2$, $O_2$, $CO$ and $CO_2$, formaldehyde in the side stream is lower than 10 ppm, and preferably lower than 1 ppm, and even more preferred lower than 0.5 ppm. In another preferred embodiment, the amounts of monomer and/or co-monomer remaining in the side stream are lower than 25% and preferably lower than 10% and even more preferred lower than 5%. High amounts of monomer in the storage tank of the side-stream product may lead to evaporation and substantial monomer loss. By keeping the amount of monomer in the side-stream product below 25% and preferably below 10%, or even below 5%, evaporation of monomer from the storage tank can be reduced and storage of the side-stream product at atmospheric conditions becomes possible. The hydrocarbon diluent issued from the side stream exiting from the distillation zone is generally used as diluent in a polymerization reactor, either homo-polymerization or co-polymerization depending upon monomers being subjected to polymerization. It is in particular very suitable for use as diluent especially in a second polymerization reactor when polymerizing under bimodal operation, or in a first as well as a second reactor, when polymerizing under monomodal operation.

Light components such as formaldehyde, $H_2$, $N_2$, $O_2$, CO and $CO_2$ exit the distillation zone with some residual monomer and diluent as a vapor stream, after passing through a vent condenser for recovery of most of the entrained diluent and monomer. These light components are further treated in an Ethylene Recovery Unit (ERU), which further separates the light components from the remaining monomer and hydrocarbon diluent. Preferably the amount of remaining diluent that is sent to the ERU is lower than 50%, and preferably lower than 30%. Preferably the amount of remaining monomer sent to the ERU is also lower than 50%. Monomer and diluent that are recovered by means of the ERU unit are preferably re-used in the polymerization process.

In one embodiment, the present distillation process is carried out in a distillation system, which comprises one distillation zone or column. Preferably said column may comprise a divided wall distillation column or divided wall column.

In another embodiment, the present distillation process is carried out in a distillation system, which comprises two distillation zones or columns. In such case the invention provides for a process comprising the steps of:
  a) passing the hydrocarbon-containing feed to a first distillation zone for subjecting said feed to distillation conditions adapted to remove a1) a bottom stream comprising co-monomer, and a2) an overhead stream comprising hydrocarbon diluent, olefin monomer and further components such as $H_2$, $N_2$, $O_2$, CO, $CO_2$, and formaldehyde, and
  b) introducing the overhead stream of step a) in a second distillation zone for subjecting said stream to distillation conditions adapted to remove b1) a bottom stream comprising substantially olefin-free hydrocarbon diluent, b2) a side stream comprising hydrocarbon diluent, and b3) an overhead vapor stream comprising olefin monomer, diluent and further components such as formaldehyde, $H_2$, $N_2$, $O_2$, CO and $CO_2$.

In yet another embodiment, the present distillation process is carried out in a distillation system, which comprises three distillation zones or columns. In such case the invention provides for a process comprising the steps of:
  a) passing said feed to a first distillation zone for subjecting said feed to distillation conditions adapted to remove a1) a bottom stream comprising co-monomer and hydrocarbon diluent and a2) an overhead stream comprising hydrocarbon diluent, olefin monomer and further components such as $H_2$, $N_2$, $O_2$, CO, $CO_2$ and formaldehyde,
  b) introducing the bottom stream of step a) in a second distillation zone for subjecting said stream to distillation conditions adapted to remove b1) a bottom stream comprising co-monomer and b2) an overhead stream comprising hydrocarbon diluent, and
  c) introducing the overhead stream of step a) in a third distillation zone for subjecting said stream to distillation conditions adapted to remove c1) a bottom stream comprising substantially olefin-free hydrocarbon diluent, c2) a side stream comprising hydrocarbon diluent, and c3) an overhead vapor stream comprising olefin monomer, diluent, and further components such as formaldehyde, $H_2$, $N_2$, $O_2$, CO and $CO_2$.

The hydrocarbon diluent obtained in stream b2) may be returned to the first distillation zone.

The present process is in particular characterized in that the process comprises the step of combining at least a part of said bottom stream with said side stream. Generally, the bottom stream of olefin free hydrocarbon diluent issued from the distillation column, and the side stream of hydrocarbon diluent are both sent to separate storage tanks. The present process involves adding—whenever necessary—at least a part of the bottom stream obtained from the distillation column to the storage tank of the side stream obtained in the distillation column. At least a part of the bottom stream is added to the side stream vessel in the case for instance that level of bottom stream in the bottom stream storage vessel is above a predetermined level. "Diluting" the side stream with the bottom stream permits to control the level of product in the storage tank for the bottom-stream product.

In another embodiment, the feed stream is condensed prior to introduction in the distillation column, thereby obtaining a condensate, whereby said condensate is stored in a condensate vessel (reflux drum).

Feeding the side stream with part of the bottom stream is further required in view of controlling the ratio of the bottom stream flow rate to the feed stream flow rate, and in particular in order to meet a theoretically determined ratio set point or a ratio set point determined in real time.

In accordance with the present process, the flow rate of the bottom stream (16) removed from the distillation column is regulated by the steps of:
  determining a ratio set point (R') which is equal to B'/F', wherein B' is the flow rate of bottom stream, and F' is the flow rate of feed stream,
  measuring the actual flow rate (F) of feed stream which is introduced in the distillation column,
  calculating a theoretical flow rate (B*) of bottom stream by multiplying the actual feed stream flow rate (F) by said ratio set point (R'),
  measuring the actual flow rate (B) of bottom stream which is removed from the distillation column, and
  regulating the flow rate of reflux stream from said condensate vessel to said distillation column for adapting the actual bottom stream flow rate (B) to the theoretical bottom stream flow rate (B*).

The flow rate of the reflux stream is thus regulated in order to meet the theoretical bottom stream flow rate (B*).

It shall be noted that in general, the term "set point" as used herein is intended to refer to a value that has been automatically or manually determined. In one embodiment said ratio set point (R') is theoretically determined. In another embodiment, e.g. as represented in the control scheme on FIG. 3, the ratio set point (R') is controlled in real-time so as to achieve a desired flow rate of vapor stream.

Further, the term "reflux stream" as used herein is intended to refer to the product stream comprising hydrocarbon diluent that is returned to the distillation column from a condensate vessel.

In accordance with the present method, the ratio set point is lower than or equal to 1.0, and preferably comprised between 0.3 and 1.0, and more preferably between 0.4 and 0.95, and may for instance comprise 0.4, 0.5, 0.6, 0.7, 0.8 or 0.9. The ratio set point of bottom stream flow rate to feed stream flow rate which is suitable according to the present process can be adjusted manually or automatically, to ensure enough olefin free diluent product and suitable venting to the ERU to remove light components. Adjustment of the present distillation system, and in particular of the bottom stream flow rate to the above-defined ratio set point permits to regulate and to increase the amount of overhead vapor stream and as a consequence to reduce the amount of light poisons which are present in the side stream.

Other improvements to the operation of the distillation column include improvements for stabilizing the distillation conditions in the distillation column. For that, the present process provides in a preferred embodiment a further step of re-boiling a portion of the bottom stream obtained in the distillation column under controlled steam flow rate and returning said re-boiled portion to the distillation column. In a preferred embodiment, the process involves controlling the rate of the steam flow as a function of the temperature in the distillation column. Preferably, the steam flow rate is controlled as a function of the temperature on a tray located in the lower half of the column, i.e. equal to or lower than ½ of the height of the column, and even more preferred located in the lower quarter of the column, i.e. equal to or lower than ¼ of the height of the column. The control of the steam flow rate as a function of the distillation temperature provides a suitable internal reflux and separation quality, while eliminating the influence of strong variations of boil-up rate on the distillation pressure. Another important advantage of the present implementation of the process according to the invention is a significant reduction of the steam consumption by the distillation process. Average steam consumption can be significantly reduced as well as costs related thereto.

More, in particular, according to the present invention, a sensitive tray temperature that is suitable for being representative for the quality of bottom product stream of the distillation column was identified. This temperature was used as an input parameter in a temperature controller system driving and controlling the reboiler steam flow rate. In addition, in order to make the control system as insensitive as possible to pressure variations in the distillation zone, the controller parameters have been chosen so as to obtain a relatively slow reaction of the controller system. By doing so, long-term variations in the column, such as throughput changes, are compensated, but short-term pressure variations pass almost unnoticed through the controller system, thus avoiding unnecessary corrections of steam flow rate to the re-boiler.

Indeed, any variation of pressure in the column results in temperature variations everywhere in the column, which are not linked to variations of composition. If a "quick" controller is used, any such variation of the column pressure and the resulting temperature variation, among others on the sensitive tray used for re-boiling steam flow control, is interpreted by the controller as a composition variation, although the composition may have remained, the same. In order to correct these assumed composition changes; the controller will increase or decrease the steam flow rate to the reboiler, which then really results in true, unwanted, composition changes. Once the pressure has returned to its nominal value, the temperature on the sensitive tray also has moved away from its setpoint, resulting in a new steam flow rate adjustment. This cycle repeats itself, with some oscillations for the system.

In order to avoid such oscillation problems, the present invention comprises the use of a slow controller. By making the controller "slow", a temperature variation resulting from quick pressure variations disappears before the controller has had time to modify the steam flow rate in a noticeable way, thus avoiding the oscillatory behavior described above.

As mentioned above, in a preferred embodiment, the feed stream is condensed prior to introduction in the distillation column, thereby obtaining a condensate, whereby said condensate is stored in a condensate vessel (reflux drum). In an embodiment, the present distillation process comprises the step of adapting the side stream flow rate to the level of the condensate vessel. For that, a level controller is provided which measures the level of condensate in the condensate vessel, and regulates the amount of condensate that is sent to a side stream storage vessel, e.g. by manipulating the opening of a valve (provided on a line for removing the side stream from the condensate vessel.

In another embodiment, the present process comprises the step of controlling the reflux flow rate of the condensate vessel, by means of an additional security level controller, which takes over the control of the reflux flow rate whenever the condensate vessel threatens to dry out, which stops the reflux pumps.

In another embodiment the present process comprises the step of adapting the sump level of the distillation column to the bottom stream flow. For that, a level controller is provided which measures the level in the column sump and regulates the amount of bottom stream removed from the column and sent to the bottom stream storage vessel, e.g. by manipulating the opening of a valve provided on the line for removing the bottom stream from the distillation column.

In yet another embodiment, the present process comprises the step of controlling the level of the distillation column sump, by means of an additional security level controller. Such level controller takes over the control of the sump level, whenever the column sump threatens to overfill.

The present invention is particularly suitable for optimizing the separation of a hydrocarbon-containing feed stream comprising olefin monomer, co-monomer and hydrocarbon diluent which is an effluent stream obtained from a polymerization process for preparing polyethylene. The present process may be applied for separating a hydrocarbon-containing feed stream obtained from a polymerization process for preparing polyethylene in monomodal or in bimodal mode. In view hereof it is possible to switch from a monomodal to a bimodal mode of preparing polyethylene in a smooth way, without the need of considerably amending operation conditions of the distillation system. In a particularly preferred embodiment, hydrocarbon diluent, monomer and co-monomer separated according to the present process are re-used in said polymerization process.

The invention will be described further with reference to the figures, which represent a schematic flow diagram of the recovery process of the invention and a representation of apparatuses, in particular distillation zones or columns useful therein.

Figure 1:
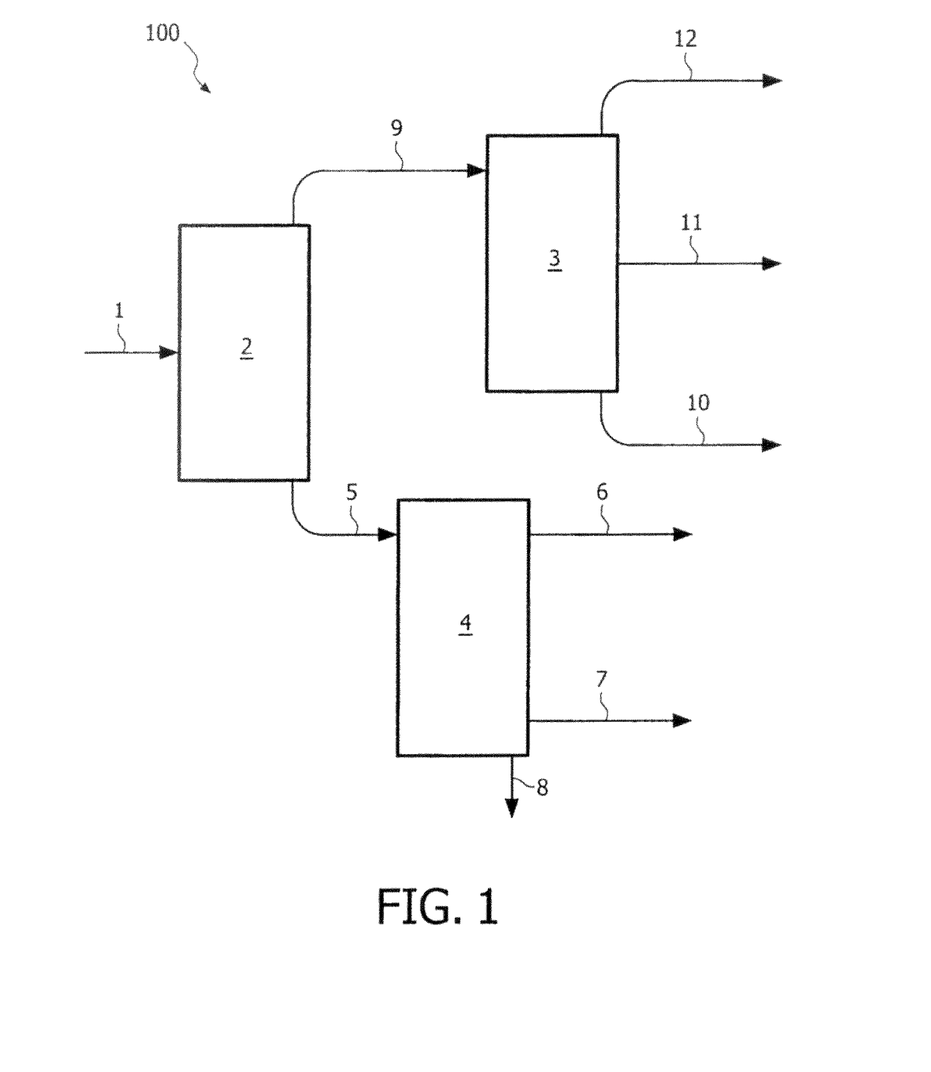
FIG. 1 represents a schematic view of an embodiment of a distillation system comprising three distillation columns according to the present invention.

As presented in FIG. 1, a distillation system 100 according to the present invention may be composed of three distillation columns 2, 3, 4, in addition to an ethylene recovery unit, that is not represented. A hydrocarbon-containing feed stream 1 that is to be separated according to the present invention in such distillation system will generally be an overhead stream coming from a flash tank and purge columns of a polymerization reactor, wherein a stream containing solvent (diluent), polymer and unreacted monomers is flashed or otherwise treated to remove solvent or diluent and monomers there from. A presently preferred component stream separated according to the invention comprises monomer, such as ethylene, co-monomer, such as 1-hexene, and diluent, such as isobutane. It should be recognized however, that the distillation system of the invention is equally applicable to other monomer, co-monomer and diluent systems so long as feed vapors comprise hydrocarbons, which permit separation by distillation. Traces of both heavier, e.g. oligomers, and lighter components such as formaldehyde, $N_2$, $H_2$, and components such as $O_2$, CO and $CO_2$ are generally also present in such effluent streams.

A first distillation column 2 realizes a rough cut between a mixture of isobutane, hexene and the heavies, which exit as liquid bottom product 5. The heavy bottom product is further treated in a second distillation column 4 and separated into three product streams. Isobutane vapor exiting as top product 6 makes the feed of the first column 2, or is recycled to a polymerization zone. A purified liquid hexene stream 7 is recovered from a tray just above the column sump and sent to storage for recycling to the polymerization reactor(s). The heavy components 8 are recovered from the column 4 sump with the draining procedure being triggered on high column bottoms temperature. The remaining monomer, isobutane, with all light components, which exits from the top 9 of the first distillation column 2, is sent to a third distillation column 3 as a vapor stream for further separation. The third distillation column 3 is used to generate three product streams. More in particular, this column 3 is used to separate olefin-free isobutane diluent from isobutane diluent containing residual amounts of (co-)monomer and from a light vapor stream comprising monomer, additional residual isobutane and further components such as formaldehyde, $H_2$, $N_2$, $O_2$, CO and $CO_2$. Substantially pure isobutane, so-called "substantially olefin-free" isobutane is obtained as liquid bottom product 10. Light components such as formaldehyde, $H_2$, $N_2$, $O_2$, CO and $CO_2$ exit the distillation column 3 with ethylene and some residual isobutane as a vapor stream 12 and are further purified and separated. Remaining isobutane exits the column 3 as a liquid side stream 11. The distillation process in the third distillation column thus permits to separate substantially olefin-free isobutane diluent in a bottom stream as well as isobutane diluent containing residual amounts of ethylene in a side stream. Both the substantially olefin-free isobutane diluent and the isobutane diluent are recycled and re-used in a polymerization process. In addition, isobutane diluent and ethylene monomer which are separated from the vapor stream 12 are also recycled and re-used in a polymerization process.

Figure 2:
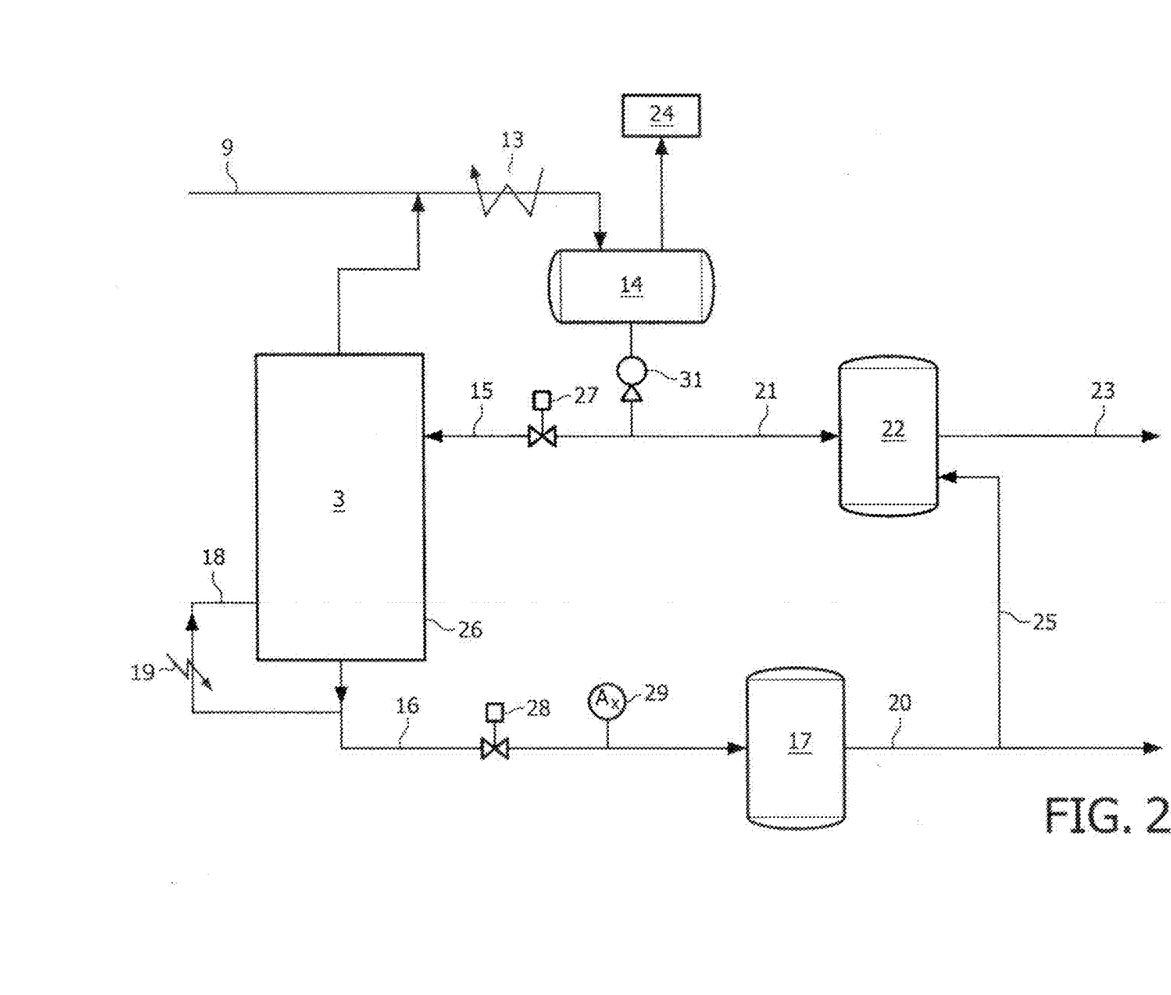
FIG. 2 is a more detailed schematic representation of an embodiment of a distillation column of a distillation system as illustrated in FIG. 1.
Figure 3:
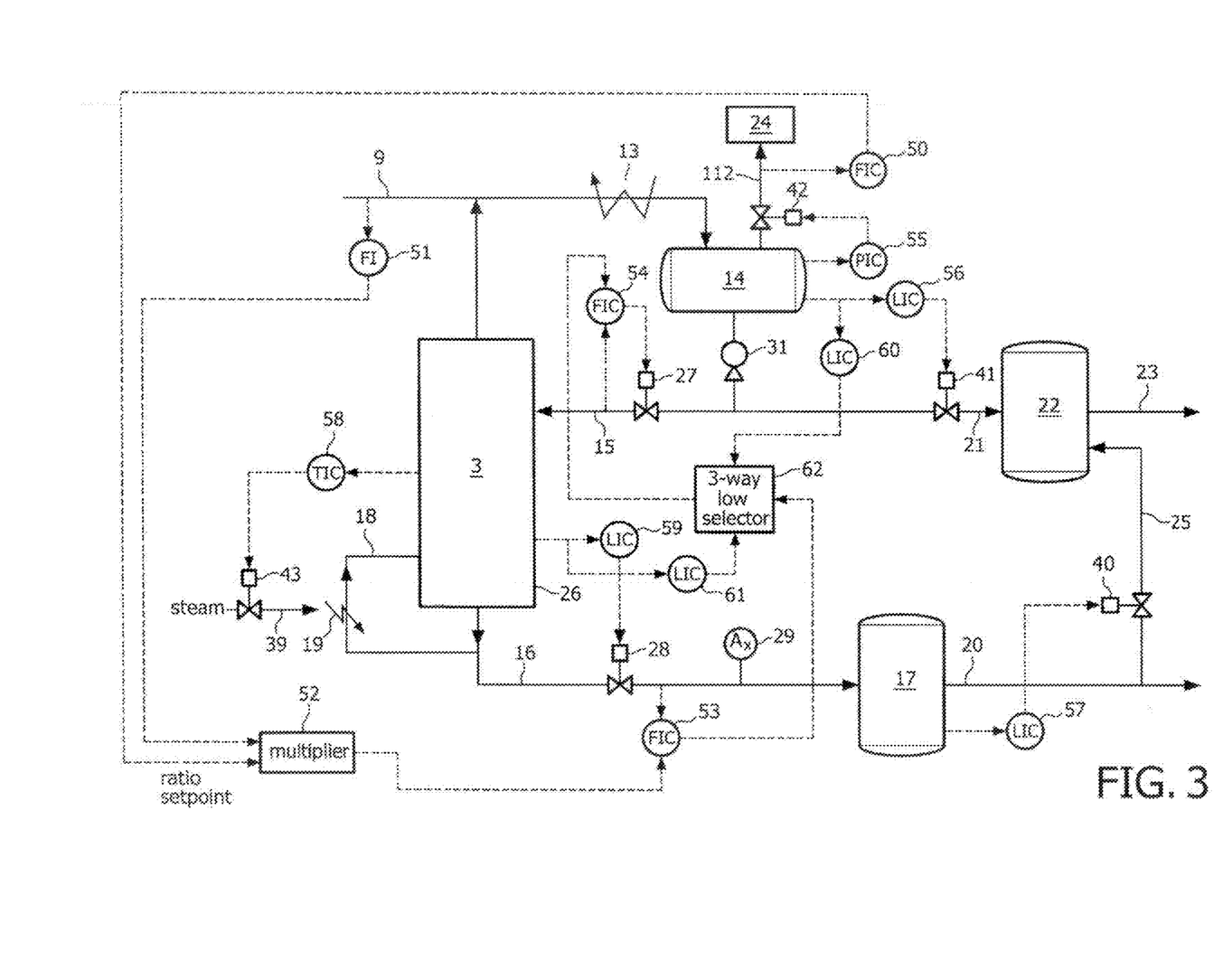
FIG. 3 represents a schematic view of control means for controlling the operation of a distillation column as illustrated in FIG. 2.

Referring now to the FIGS. 2 and 3, the separation of a vapor stream 9 comprising the monomer, isobutane diluent and further components such as formaldehyde, $H_2$, $N_2$, $O_2$, CO and $CO_2$, which exits from the top of the first column 2 (see FIG. 1), is further illustrated. A third distillation zone is illustrated which comprises a distillation column 3; a first storage vessel 22 for storing the side stream product, and a second storage vessel 17 for storing the bottom stream product. The distillation column 3 is interconnected to a condensate vessel 14 for storing a condensate of the overhead stream 9.

A hydrocarbon-containing feed stream is removed from the first distillation column 2 (FIG. 1) by way of line 9 and passed through a water-cooled heat exchanger or condenser 13. The condensate formed is passed to a condensate vessel 14. A part of the liquid condensate comprising ethylene, isobutane and lighter components such as formaldehyde, $N_2$, $H_2$, and components such as $O_2$, CO and $CO_2$ is passed from the condensate vessel 14 by way of line 15 as feed to the third distillation column 3. Conditions within the distillation column 3 are such that a bottom stream 16, which comprises isobutane diluent substantially free of ethylene, is obtained. This bottom stream 16 is removed from a lower portion of the distillation column 3 by way of line 16, passed through a water-cooled heat exchanger (not shown), and introduced into vessel 17 for storage and further handling.

Isobutane diluent and residual amounts of ethylene, are removed from the third distillation column 3 as a liquid side stream 21 from the condensate vessel 14 by way of line 21, and introduced into a storage vessel 22 for storage and further handling. The isobutane diluent is removed from vessel 22 by way of line 23. Light components such as formaldehyde, $H_2$, $N_2$, $O_2$, CO and $CO_2$ exit the distillation column 3 with the remaining ethylene and some residual isobutane as a vapor stream from the condensate vessel 14, passing through a vent condenser (not shown) for recovery of most of the entrained isobutane, and are further treated in an ethylene recovery unit 24.

The third distillation zone further comprises means (devices) for providing re-boiling of a portion of the bottom stream 16 under a controlled steam flow rate. Control of the steam flow rate may be obtained by means of a level controller. More in particular, a portion of bottom stream is used as reboiler heat for the distillation column 3 by passing a portion of the bottom stream through a steam-heated heat exchanger 19 and returning the heated stream to the distillation column 3 by way of line 18. The isobutane diluent is removed from vessel 17 by way of line 20, for recycle either to a homo-polymerization or a co-polymerization reactor.

Practically, a temperature controller 58 may control a sensitive tray temperature, representative for the bottom product quality, by manipulating—when the measured temperature is different from a pre-determined temperature—the opening of a valve 43, provided on the line for feeding steam 39 to the reboiler 19. Preferably the temperature of a tray located in the lower half of the column can be measured by said temperature controller 58.

The distillation system has been adapted by providing several controllers.

The third distillation zone is in particular provided with means or devices for connecting removal line 20 with the side stream storage vessel 22. Excess ethylene-free isobutane diluent is sent to the storage vessel 22 for isobutane diluent containing residual amounts of ethylene through line 25. This permits the production of more ethylene-free isobutane diluent than necessary for recycle purposes, especially since the production in excess can be added to the side stream product.

More in particular, in a preferred embodiment, the bottom stream 16 is removed from the distillation column and fed to a bottom stream storage vessel 17. Likewise, a side stream 21 is fed to a side stream storage vessel 22. A feed line 25 connects the bottom stream line 20 removing liquid bottom product from the bottom product vessel 17 with the side stream storage vessel 22. The level of bottom stream present in the storage vessel 17 is measured using a level controller 57. The measured level is compared to a pre-determined level. When the measured level exceeds the pre-determined level, at least part of the bottom stream is sent to the side stream vessel 22. The level controller 57 controls the level of bottom stream product in the storage vessel 17 by manipulating the opening of the valve 40 provided on line 25 connecting the removal line 20 with the side product storage tank 22. The present method aims at keeping the level of bottom stream in said bottom stream storage vessel 17 at a relatively constant value.

The present process includes the step of adapting by means of a ratio controller (not shown), the ratio of the bottom stream 16 flow rate removed from the third distillation zone to the overhead stream 9 flow rate introduced in the third distillation zone. A ratio controller thus controls the ratio between olefin free isobutane bottom stream 16 and the feed to the column by way of line 9. This ratio is controlled by manipulating the reflux to the column by way of line 15 and opening or closing a control valve 27 on that line 15. By doing so, the bottom draw rate becomes independent from downstream variations. Only variations in the feed rate to the column through line 9 will impact on the olefin-free isobutane draw rate. By choosing a suitable value of the ratio set point, it is ensured that in all circumstances enough olefin-free isobutane is produced to accordingly reduce the production of isobutane in the side stream and so to ensure a suitable vapor flow rate to the ethylene recovery unit such that all light components are entrained.

Practically, a ratio set point, i.e. the ratio of the bottom stream 16 flow rate to the feed stream 9 flow rate, is set by means of a ratio controller. A flow controller 50 controls the overhead stream 112, and thus the amount of light components that are evacuated to an ethylene recovery unit by manipulating the set point of the ratio controller. The ratio set point is a function of the desired overhead stream flow rate. This ratio set point is preferably lower than or equal to 1.0, and is for instance comprised between 0.3 and 1.0, or between 0.4 and 0.95.

The flow rate of the feed stream 9 to the distillation column 3 is measured by means of a flow measuring device 51. This measured flow rate is used in a multiplier 52 together with the ratio set point in order to calculate a set point or theoretical value of the bottom flow rate 16. In particular, such multiplier 52 multiplies the feed flow rate by the ratio set point and uses this calculated value as set point for the flow controller 53, which controls the bottom flow rate 16. The flow controller 53 controls the bottom flow rate by manipulating the reflux stream 15 flow rate, through a reflux flow rate controller 54. The reflux flow rate controller 54 controls the reflux stream flow rate 15 by manipulating opening of the valve 27 provided on the reflux line 15 connecting the condensate vessel 14 with the distillation column 3.

Furthermore, the present process comprises the step of controlling the level of the distillation column sump 26. The level of the distillation column sump 26 is controlled by means of level controller 59 which measures the level in the column sump 26 and regulates this level—when the measured level is different from a pre-determined level—by manipulating the opening of a valve 28 provided on the line for removing the bottom stream 16 from the distillation column 3.

In addition, the present process also comprises the step of controlling the reflux flow rate of the condensate vessel. A level controller 56 controls the level in the condensate vessel 14—when the measured level is different from a pre-determined level—by manipulating the opening of a valve 41 provided on the line for removal the side stream 21 from the condensate vessel 14. Further, a pressure controller 55 is provided which controls the pressure in the condensate vessel 14 of the distillation column 3 by manipulating—when the measured pressure is different from a pre-determined pressure—opening of a valve 42, provided on the line for removing the overhead stream 112.

Further developments of the distillation system were applied in order to face at least two big disturbances. In particular, the present invention further provides two additional security controllers, which are operative in conditions wherein there is a significant change in the feed stream and allow the distillation system to remain operative and stable under changed feed conditions. One security controller 60 consists of an additional level controller added on the condensate vessel 14. In this embodiment, the additional level controller 60 is added on the condensate vessel 14 that takes over the control of the reflux flow rate whenever the condensate vessel would threaten to dry out (which stops the reflux pumps). A problem may occur in the case of a stoppage or a strong reduction of the feed 9 to the column. The consequence thereof would be a quick level reduction in the reflux drum 14. However, a complete emptying of this vessel must be avoided to protect the reflux pump 31. This controller 60 takes over the control of the reflux flow rate whenever the condensate vessel would threaten to dry out. Therefore, the invention comprises the use of an additional controller 60, which controls manipulation of a reflux control valve 27, and which quickly reduces its opening to reduce the reflux.

In another embodiment, an additional level controller 61 is added on the third distillation column sump. Another problem may occur in the case of the closure of the olefin-free isobutane draw-off valve 28 in case of an in sufficient bottom product quality. In case the olefin-free diluent stream contains excessive amounts of monomer and/or co-monomer, as monitored by online analyzers 29, a control valve 28 on the bottom stream is closed automatically in order to avoid sending bad product to storage tank 17. In such a case, the column sump 26 starts filling and could overfill. The invention provides the use of an additional controller 61, which controls manipulation of the reflux control valve 27 and quickly reduces its opening to reduce the reflux.

The level controllers 56 and 59 have normal set point values of say X % and Y %, respectively, typically 50% in both cases, whereby X corresponds to level of condensate in the condensate vessel and Y corresponds to the level of product in the column sump. The security level controller 60 has a set point that is constantly adapted to be (X−5)%, whereas the security level controller 61 has a set point that is constantly adapted to be (Y+5) %, so that these additional controllers come into action whenever the corresponding level deviates by more than 5% from their nominal set point. Both security controllers are very "aggressive" (high gain and low integral time), in order to react quickly in case they have to come into action.

The present invention further provides a 3-way low selector 62, which is operably linked to the security level controllers 60 and 61, and to the flow controllers 53 and 54. The set point of the reflux stream flow rate controller 54 is determined by this 3-way low selector 62, which selects the lowest set point among three set points, i.e. among     a first set point determined by the flow controller 53 which controls the bottom flow rate 16,     a second set point determined by the level controller 60 which is a security level controller of the condensate vessel, and     a third set point determined by the level controller 61 which is a security level controller of the column sump 26.

In normal conditions, the set point is determined by the controller 53. However, under changed feed conditions, the set points determined by the controllers 60 and/or 61 may be decisive.

In addition a process is provided that comprises a pressure controller 55 which controls the pressure in the condensate vessel 14 of the distillation column 3 by manipulating opening of a valve 42, provided on the line for removing the overhead stream 112, when the measured pressure is different from a pre-determined pressure.

Control procedures which are carried out in accordance with the present process are also illustrated on FIG. 3 and can be summarized as follows:

The flow controller 50 controls the overhead stream 112 by manipulating the set point of the ratio controller, i.e. the ratio of the bottom stream flow rate 16 to the feed stream flow rate 9.

The flow measuring device 51 measures the feed flow rate 9 to the distillation column 3. This measurement is used in the multiplier 52 together with the ratio set point in order to calculate the set point of bottom flow rate 16.

The multiplier 52 multiplies the feed flow rate by the ratio set point and sends its result as set point for the flow controller 53, which controls the bottom flow rate 16.

The flow controller 53 controls the bottom flow rate by manipulating the reflux flow rate 15, through the reflux flow rate controller 54.

The flow rate controller 54 controls the reflux flow rate 15 by manipulating the opening of the valve 27 of the reflux stream 15. The set point of this controller is given by a 3-way low selector 62 that selects the lowest set point among the three set points coming from the controllers flow controller 53 (bottom flow rate 16 controller), security level controller 60 (additional condensate vessel 14 level controller) and security level controller 61 (additional column sump 26 level controller). In normal conditions, the set point is coming from the flow controller 53.

The pressure controller 55 controls the pressure in the condensate vessel 14 of the distillation column 3 by manipulating the opening of the valve 42 of the overhead stream 112.

The level controller 56 controls the level in the condensate vessel 14 by manipulating the opening of the valve 41 of the side stream 21.

The level controller 57 controls the level of bottom-stream product in the storage vessel 17 by manipulating the opening of the valve 40 of the line 25 from removal line 20 to the side product storage tank 22.

The temperature controller 58 controls a sensitive tray temperature, image of the bottom product quality, by manipulating the opening of the valve 43 of the steam flow rate 39 to the reboiler 19.

The level controller 59 controls the level in the column sump 26 by manipulating the opening of the valve 28 on the bottom stream 16.

The level controller 60 is an additional level controller added on the condensate vessel 14 that takes over the control of the reflux flow rate whenever the condensate vessel would threaten to dry out.

The level controller 61 is an additional level controller added on the column sump that takes over the control of the reflux flow rate whenever the column sump would threaten to overfill.

Figure 4:
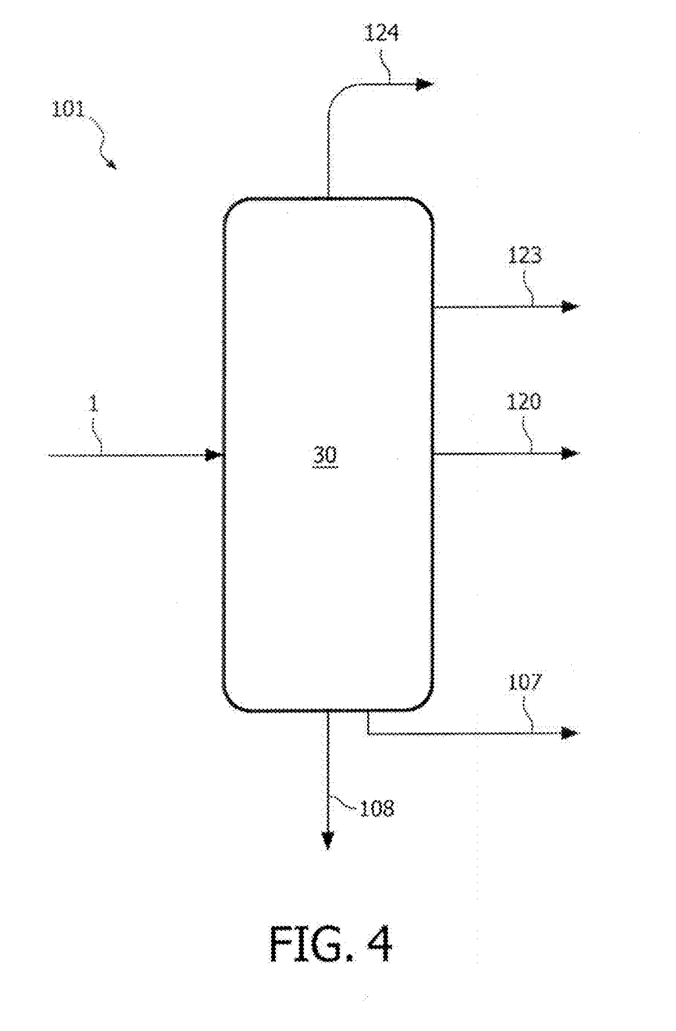
FIG. 4 represents a schematic view of another embodiment of a distillation system comprising one distillation column according to the present invention.

FIG. 4 represents another embodiment of a distillation system 101 according to the present invention comprising of a single distillation column 30. A hydrocarbon-containing feed stream 1 comprising isobutane diluent, ethylene monomer and hexene co-monomer is separated in such distillation system as follows. The distillation column 30 realizes a separation of the feed stream 1 into:

heavy components which exit as liquid bottom product 108 and which may be recovered batch wise from the column 30 sump;
a purified liquid hexene stream 107 which may be recovered and sent to storage for recycling to the polymerization reactor(s);
substantially olefin-free isobutane diluent which is obtained as liquid product through line 120;
residual isobutane diluent which exits the column 30 as a liquid side product trough line 123; and
a light vapor stream comprising ethylene, residual isobutane and further components such as formaldehyde, $H_2$, $N_2$, $O_2$, CO and $CO_2$, is sent to an Ethylene Recovery unit (ERU) 124 for further recovery of the ethylene and the isobutane.

In conclusion, the present invention provides an optimized distillation process and system for the separation of a hydrocarbon-containing feed stream. The present invention involves various process control improvements, which result in advantageous effects and provide improved separation of lighter components from other components comprised in a hydrocarbon feed stream.

EXAMPLE

The present example illustrates the implementation of a distillation system according to the present invention.

A isobutane-containing feed stream issued from a monomodal polymerization process for the polymerization of ethylene in the presence of 1-hexene as co-monomer and isobutane as hydrocarbon diluent, was sent to a conventional distillation system, in particular a system which is not provided with means for connecting the bottom stream with the side stream.

For comparison, an isobutane-containing feed stream issued from a monomodal polymerization process for the polymerization of ethylene in the presence of 1-hexene as co-monomer and isobutane as hydrocarbon diluent, was sent to a distillation system according to the invention and provided with means for connecting the bottom stream with the side stream.

The mass flow rate, i.e. the flow rate of the vapor stream 112 sent to the Ethylene recovery unit 24 (ERU) was continuously measured in both systems. Also, the pressure in the condensate vessel was measured and compared to a determined set point.

Figure 5:
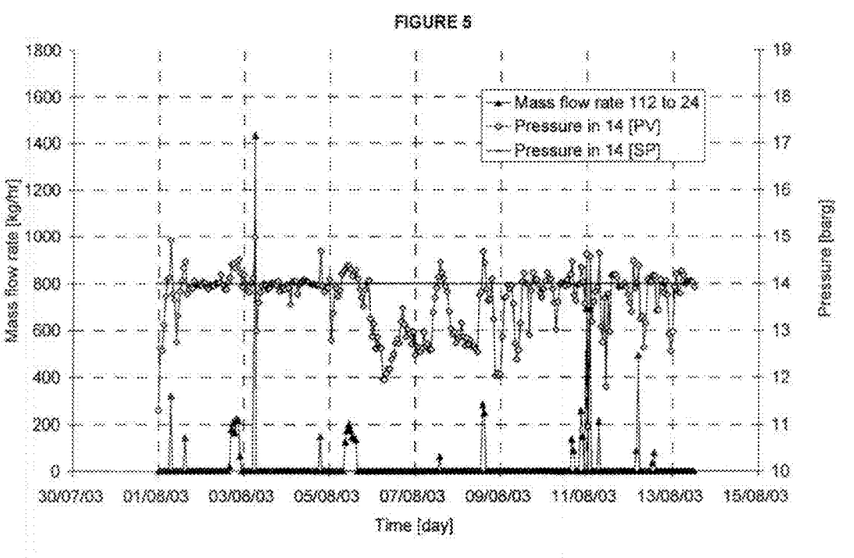
FIGS. 5 and 6 illustrate graphs plotting distillation parameters such as the flow rate of the vapor stream and the pressure in the condensate vessel measured in a conventional distillation system and in a distillation system according to the invention, respectively.
Figure 6:
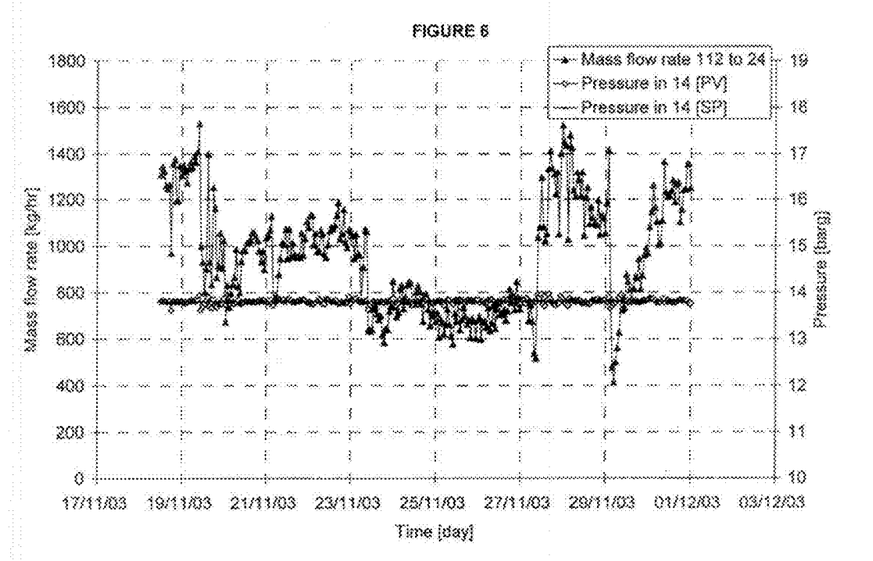

FIGS. 5 and 6 illustrate the results of these measurements. The illustrated parameters were measured continuously. The figures represent average hourly values over a period of several days. In these figures, the set point pressure is illustrated as a straight horizontal line. In particular the pressure set points are 14 barg and 13.8 barg in the systems of FIGS. 5 and 6, respectively. The difference in pressure set points between both systems is not significant, and does not explain other differences observed between the two distillation systems.

FIG. 5 illustrates that the mass (vapor) flow rate is very low or even absent, i.e. equal to zero, at most time points, which indicates that there is low or even no evacuation of light components via the vapor stream out of the distillation system. These light components are consequently sent to the side stream, and could be re-used together with the recycled isobutane in a polymerization reaction. This conventional distillation system thus provides a sub-optimal separation of light components, including $H_2$, $N_2$, $O_2$, CO and/or $CO_2$, from the diluent. As a consequence, re-use of diluent containing these light components in a polymerization process may result in sub-optimal polymerization conditions.

Furthermore, it can be noted from FIG. 5 that the distillation system shows stability problems, as the pressure in the condensate vessel is considerably different from the pressure set point. Conditions in the condensate vessel reflect conditions in the distillation column; and the oscillation of the pressure values in the condensate vessel, indicate that the distillation column is subject to important variation in operational conditions, which hampers its effective operation.

FIG. 6 illustrates the situation in a distillation system according to the invention and clearly illustrates a considerable mass (vapor) flow rate, which will in average be comprised around 1000 kg/hour, and in any case higher than zero. As a consequence thereof, this system provides an acceptable evacuation of light components contained in the vapor stream out of the distillation system, and permits to reduce the amount of light components that are sent to the side stream.

Furthermore, it can be seen from FIG. 6, that the distillation system is highly stable, as shown by the fact that the pressure in the condensate vessel approximates the set point pressure value at all measured time point. According to this system, the distillation column is subject to relatively constant operational conditions, which assures efficient separation of the feed stream.

Improved efficiency and stability of a distillation method and system according to the present invention is further illustrated by means of the following comparative data (TABLE 1) which illustrates some quantitative differences between a conventional distillation system and a distillation system according to the invention.

TABLE 1

Operational parameters

|  | conventional distillation system | distillation system of the invention |
|---|---|---|
| Pressure set point in distillation column 3 | 14.00 barg | 13.80 barg |
| Average of actual pressure in distillation column 3 | 13.75 barg | 13.79 barg |
| Standard deviation of actual pressure vs. set point pressure, | 0.53 barg | 0.04 barg |
| Average feed flow rate 9 | 18.2 t/hr | 17.1 t/hr |
| Average vapor flow rate to ERU 112 | 93.1 kg/hr | 745.1 kg/hr |
| Average bottom stream flow rate 16 | 1.8 t/hr | 5.0 t/hr |
| Average reflux flow rate 15 | 17.1 t/hr | 16.8 t/hr |
| Average side stream flow rate 21 | 16.3 t/hr | 12.9 t/hr |
| Average transfer flow rate 25 from bottom product line 20 to side product storage tank 22 | Not applicable | 3.3 t/hr |
| Average reboiler steam consumption 39 | 2440 kg/hr | 1880 kg/hr |
| Ethylene in olefin-free isobutane | <1 ppm | <1 ppm |

The invention claimed is:

1. A process for the separation of a hydrocarbon-containing feed stream comprising olefin monomer, co-monomer and hydrocarbon diluent, comprising:
introducing said feed stream to a distillation column;
subjecting said feed stream to distillation conditions whereby
a bottom stream comprising substantially olefin-free hydrocarbon diluent is removed from the distillation column and stored in a bottom stream storage vessel;
a side stream comprising hydrocarbon diluent is removed from the distillation column and stored in a side stream storage vessel; and
an overhead vapor stream comprising olefin monomer, and a component selected from the group consisting of $H_2$, $N_2$, $O_2$, CO, $CO_2$ and formaldehyde is removed;
removing bottom stream from said bottom stream storage vessel;
feeding at least part of the bottom stream that is removed from the bottom stream storage vessel to said side stream storage vessel, wherein feeding at least a part of the bottom stream that is removed from the bottom stream storage vessel to said side stream storage vessel is regulated by measuring the level of said bottom stream in said bottom stream storage vessel, comparing said measured level with a pre-determined level, and when said measured level exceeds said pre-determined level, feeding at least part of the bottom stream that is removed from the bottom stream storage vessel to said side stream storage vessel.

2. The process of claim 1, wherein the feed stream is condensed prior to introduction in the distillation column, thereby obtaining a condensate, and wherein said condensate is stored in a condensate vessel.

3. The process of claim 2, wherein said condensate is removed from said condensate vessel and at least a portion thereof is returned to the distillation column as reflux stream.

4. The process of claim 1 further comprising re-boiling a portion of the bottom stream obtained in the distillation column under controlled steam flow rate and returning said re-boiled portion to the distillation column.

5. The process of claim 4, wherein said steam flow rate is controlled as a function of the temperature in the distillation column and of the temperature on a tray located in the lower half of the column.

6. The process of claim 1 further comprising controlling the level of a distillation column sump.

7. The process of claim 2 further comprising controlling the flow rate of the reflux stream from the condensate vessel to the distillation column.

8. The process of claim 1 further comprising:
separating the feed stream prior to introducing said feed stream to the distillation column into a bottom stream comprising co-monomer, and an overhead stream comprising olefin monomer and a component selected from the group consisting of $H_2$, $N_2$, $O_2$, CO, $CO_2$, and formaldehyde, and feeding said overhead stream to said distillation column.

9. The process of claim 1 further comprising:
separating the feed stream prior to introducing said feed stream to the distillation column into a bottom stream comprising co-monomer and hydrocarbon diluent, whereby said bottom stream is further separated into a stream comprising co-monomer and a stream comprising hydrocarbon diluent, and an overhead stream comprising olefin monomer and a component selected from the group consisting of $H_2$, $N_2$, $O_2$, CO, $CO_2$ and formaldehyde, and feeding said overhead stream to said distillation column.

10. The process of claim 1, wherein said hydrocarbon-containing feed stream comprising olefin monomer, co-monomer and hydrocarbon diluent is an effluent stream obtained from a polymerization process for preparing polyethylene.

11. The process of claim 1, wherein separated hydrocarbon diluent, olefin monomer and co-monomer are re-used in a polymerization process.

12. The process of claim 1, wherein said olefin monomer is ethylene, said co-monomer is 1-hexene and said hydrocarbon diluent is isobutane.

13. A process for the separation of a hydrocarbon-containing feed stream comprising olefin monomer, co-monomer and hydrocarbon diluent, comprising:
introducing said feed stream to a distillation column;
subjecting said feed stream to distillation conditions whereby
a bottom stream comprising substantially olefin-free hydrocarbon diluent is removed;
a side stream comprising hydrocarbon diluent is removed; and
an overhead vapor stream comprising olefin monomer, and a component selected from the group consisting of $H_2$, $N_2$, $O_2$, CO, $CO_2$ and formaldehyde is removed; and
feeding at least a part of said bottom stream to said side stream, wherein a flow rate of the bottom stream removed from the distillation column is regulated by:

determining a ratio set point (R') which is equal to B'/F', wherein B' is the flow rate of bottom stream and F' is a flow rate of the feed stream;

measuring an actual flow rate (F) of the feed stream which is introduced in the distillation column;

calculating a theoretical flow rate (B*) of bottom stream by multiplying the actual feed stream flow rate (F) by said ratio set point (R');

measuring an actual flow rate (B) of bottom stream which is removed from the distillation column; and regulating a flow rate of the reflux stream from a condensate vessel to said distillation column for adapting the actual bottom stream flow rate (B) to the theoretical bottom stream flow rate (B*).

14. The process of claim 13, wherein said ratio set point is lower than or equal to 1.0.

15. The process of claim 13 further comprising:

removing the bottom stream from the distillation column and storing said bottom stream in a bottom stream storage vessel;

removing the side stream from the distillation column and storing said side stream in a side stream storage vessel;

removing bottom stream from said bottom stream storage vessel; and feeding at least part of the bottom stream that is removed from the bottom stream storage vessel to said side stream storage vessel.

16. A distillation system comprising:

a distillation column which is configured to separate a hydrocarbon-containing feed stream comprising olefin monomer, co-monomer and hydrocarbon diluent into a bottom stream comprising substantially olefin-free hydrocarbon diluent, a side stream comprising hydrocarbon diluent and an overhead vapor stream comprising olefin monomer, and a component selected from the group consisting of $H_2$, $N_2$, $O_2$, CO, $CO_2$ and formaldehyde, wherein said distillation system comprises:

a feeding line for feeding said feed stream to said distillation column;

a removal device for removing said bottom stream from said distillation column, a bottom stream storage vessel operably connected to said removal device for storing removed bottom stream, and a removal line operably connected to said bottom stream storage vessel for removing bottom stream from said bottom stream storage vessel;

a removal device for removing said side stream from said distillation column, a side stream storage vessel operably connected to said removal device for storing removed side stream, and a removal line operably connected to said side stream storage vessel for removing side stream from said side stream storage vessel;

a removal device for removing said overhead vapor stream from said distillation column;

a connecting line connecting said removal line operably connected to said bottom stream storage vessel with said side stream storage vessel; and a level controller for measuring the level of bottom stream in said bottom stream storage vessel and for regulating feeding of at least a part of said bottom stream to said side stream, and a valve which is provided on said connecting line and operably connected to said level controller.

17. The distillation system of claim 16 further comprising a condenser for condensing said feed stream prior to feeding in the distillation column and a condensate vessel for storing said condensed feed stream.

* * * * *